(12) United States Patent
Assargård et al.

(10) Patent No.: US 9,938,955 B2
(45) Date of Patent: Apr. 10, 2018

(54) ADJUSTMENT OF IGNITION TIMING AT CUT OUT

(71) Applicant: HUSQVARNA AB, Huskvarna (SE)

(72) Inventors: Johan Assargård, Jönköping (SE); Ricky Sundkvist, Granna (SE); Stefan Wixe, Huskvarna (SE); Martin Axelsson, Hestra (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/028,223

(22) PCT Filed: Sep. 22, 2014

(86) PCT No.: PCT/SE2014/051084
§ 371 (c)(1),
(2) Date: Apr. 8, 2016

(87) PCT Pub. No.: WO2016/048199
PCT Pub. Date: Mar. 31, 2015

(65) Prior Publication Data
US 2016/0237977 A1    Aug. 18, 2016

(30) Foreign Application Priority Data
Oct. 9, 2013  (SE) ...................... 1351196

(51) Int. Cl.
*F02P 9/00* (2006.01)
*F02P 5/145* (2006.01)
(Continued)

(52) U.S. Cl.
CPC .............. *F02P 9/005* (2013.01); *F02B 25/00* (2013.01); *F02B 25/16* (2013.01); *F02B 63/02* (2013.01);
(Continued)

(58) Field of Classification Search
CPC .... F02P 9/005; F02P 9/00; F02P 5/145; F02P 5/1502; F02P 2400/06
(Continued)

(56) References Cited

U.S. PATENT DOCUMENTS 3,703,887 A    11/1972  Panhard
4,883,033 A    11/1989  Hosoe et al.
(Continued)

FOREIGN PATENT DOCUMENTS

CN    1477306 A    2/2004
CN    1690407 A    11/2005
(Continued)

OTHER PUBLICATIONS

International Search Report and Written Opinion for International Application No. PCT/SE2014/051084 dated Jun. 2, 2015, all enclosed pages cited.
(Continued)

*Primary Examiner* — Mahmoud Gimie
(74) *Attorney, Agent, or Firm* — McNair Law Firm, P.A.

(57) ABSTRACT

An internal combustion engine (1) may include a combustion chamber (41) into which a mixture (40) of fuel and air is supplied, a spark plug (50) disposed proximate to the combustion chamber (41) to ignite the mixture (40) by generating a spark such that ignition of the mixture drives a piston (6) operably coupled to a crank portion (12) of the engine (1), a speed sensor (102) configured to determine engine speed, and an electronic control unit (100) configured to control operation of the spark plug (50). The electronic control unit (100) may be configured to initiate a speed limitation operation in response to engine speed reaching a cut out speed threshold and to control ignition timing within an operating band (320) of ignition angles prior to engine speed reaching the cut out speed threshold. The speed (Continued)

limitation operation may include skipping application of sparks. The electronic control unit (100) is further configured to apply a changed ignition angle (330) relative to the operating band (320) for first at least one spark initiated after the speed limitation operation.

18 Claims, 6 Drawing Sheets

(51) Int. Cl.
| | | |
|---|---|---|
| *F02P 5/15* | (2006.01) | |
| *F02B 25/00* | (2006.01) | |
| *F02B 63/02* | (2006.01) | |
| *F02D 41/14* | (2006.01) | |
| *F02D 41/22* | (2006.01) | |
| *F02B 25/16* | (2006.01) | |
| *F02M 17/04* | (2006.01) | |
| *F02B 75/02* | (2006.01) | |

(52) U.S. Cl.
CPC ......... *F02D 41/1497* (2013.01); *F02D 41/22* (2013.01); *F02M 17/04* (2013.01); *F02P 5/145* (2013.01); *F02P 5/1502* (2013.01); *F02B 2075/025* (2013.01); *F02D 2400/06* (2013.01); *Y02T 10/46* (2013.01)

(58) Field of Classification Search
USPC ........................................ 123/406.23, 406.59
See application file for complete search history.

(56) References Cited

U.S. PATENT DOCUMENTS

| | | | |
|---|---|---|---|
| 6,868,829 B1 | 3/2005 | Geyer et al. | |
| 6,932,064 B1 | 8/2005 | Kolak et al. | |
| 7,249,586 B2* | 7/2007 | Andersson | F02P 9/005 |
| | | | 123/335 |
| 2005/0022790 A1* | 2/2005 | Nickel | F02M 7/12 |
| | | | 123/438 |
| 2005/0216132 A1 | 9/2005 | Masters et al. | |
| 2006/0065236 A1* | 3/2006 | Andersson | F02P 9/005 |
| | | | 123/335 |
| 2012/0304966 A1* | 12/2012 | Fong | F02P 9/005 |
| | | | 123/406.23 |

FOREIGN PATENT DOCUMENTS

| | | |
|---|---|---|
| DE | 3319025 A1 | 11/1984 |
| EP | 1178208 A2 | 2/2002 |
| EP | 1643121 A2 | 4/2006 |
| EP | 1795745 A2 | 6/2007 |

OTHER PUBLICATIONS

Chapter I International Preliminary Report on Patentability for International Application No. PCT/SE2014/051084 dated Mar. 28, 2017, all enclosed pages cited.

* cited by examiner

ADJUSTMENT OF IGNITION TIMING AT CUT OUT

TECHNICAL FIELD

Example embodiments generally relate to internal combustion engines and, more particularly, relate to control of ignition timing within such engines.

BACKGROUND

Internal combustion (IC) engines commonly control air/fuel (A/F) ratio as a means by which to achieve a satisfactory combination of low fuel consumption, low exhaust emissions, good runability and high efficiency. In many cases, achieving these characteristics requires maintaining the A/F-ratio within relatively narrow limits by controlling operation of a fuel supply system that may employ, for example, a carburetor or a fuel injection system.

Engine speed is one parameter that is often controlled in connection with achieving good engine running characteristics. In some cases, control of engine speed is at least in part accomplished by skipping ignitions if the engine speed exceeds a cut out speed threshold to avoid over-revving the engine. When there is no spark applied above the speed limitation of the engine (i.e., the cut out speed threshold), the engine will generally charge better as the burned gases scavenge out. This will cause an increase in cylinder pressure (e.g., more than 100% in some cases) when the spark returns, which may cause damage to the cylinder or components therein and reduce the operating life of the engine. To address this concern, it may be possible to delay the ignition, i.e. reduce the ignition angle. Dependent upon size of delay and amount of time of applying the delay, delaying the engine ignition to reduce cylinder pressure could, however, cause problems with heat.

Conventionally, an ignition angle map (predetermined relation between ignition angle and rpm) would be used for controlling the ignition angle. To avoid a too high cylinder pressure when ignitions are again permitted after cut out, the ignition angle map would commonly include a drop in the ignition angle at a speed lower than the cut out speed. In some cases, the drop may be up to 5 degrees. This type of regulation may not be favorable as e.g. for some circumstances during normal operation the speed may not reach the cut out speed but will come close to the cut out speed and thus be within the reduced ignition angle range, possibly for an extended period of time. If the cut out speed is not reached, no sparks will be skipped and thus the speed will not be reduced by any logic (other than possibly as a result of the reduced ignition angle itself). A reduced ignition angle may then have the effect that there are still comparatively hot gases in the combustion chamber when the exhaust port is opened, and these will blow into the muffler, which may lead to severe heat problems. Meanwhile, increasing the amount of fuel may result in cylinder pressure reduction, but would cause higher fuel consumption and emission levels.

BRIEF SUMMARY OF SOME EXAMPLES

Some example embodiments may provide for better control of ignition timing that may avoid heat problems and keep the pressures within the cylinder lower, while avoiding excessive increases in fuel consumption and emission levels. In this regard, for example, some embodiments may provide for changing the ignition angle at least of the first spark or sparks after exiting from speed limitation.

In one example embodiment, an internal combustion engine is provided, preferably a crankcase scavenged two-stroke internal combustion engine. The internal combustion engine may include a combustion chamber into which a mixture of fuel and air is supplied, a spark plug disposed proximate to the combustion chamber to ignite the mixture by generating a spark such that ignition of the mixture drives a piston operably coupled to a crank portion of the engine, a speed sensor configured to determine engine speed, and an electronic control unit configured to control operation of the spark plug. The electronic control unit may be configured to initiate a speed limitation operation in response to engine speed reaching a cut out speed threshold and to control ignition timing within an operating band of ignition angles prior to engine speed reaching the cut out speed threshold. The speed limitation operation may include skipping application of sparks. The electronic control unit, in case the speed limitation operation having been performed, is further configured to apply a changed ignition angle relative to the operating band for the first at least one spark initiated after the speed limitation operation.

In another example embodiment, a hand-held device is provided. The hand-held device may include a working assembly configured to perform a cutting operation and an internal combustion engine operably coupled to the working assembly to power the working assembly. The internal combustion engine may include a combustion chamber into which a mixture of fuel and air is supplied, a spark plug disposed proximate to the combustion chamber to ignite the mixture by generating a spark such that ignition of the mixture drives a piston operably coupled to a crank portion of the engine, a speed sensor configured to determine engine speed, and an electronic control unit configured to control operation of the spark plug. The electronic control unit may be configured to initiate a speed limitation operation in response to engine speed reaching a cut out speed threshold and to control ignition timing within an operating band of ignition angles prior to engine speed reaching the cut out speed threshold. The speed limitation operation may include skipping application of sparks. The electronic control unit, in case the speed limitation operation having been performed, is further configured to apply a changed ignition angle relative to the operating band for first at least one spark initiated after the speed limitation operation.

In another example embodiment, a method of controlling an internal combustion engine is provided. The method may include monitoring engine speed, controlling ignition timing of the engine within an operating band of ignition angles prior to engine speed reaching a cut out speed threshold, initiating a speed limitation operation in response to engine speed reaching the cut out speed threshold the speed limitation operation includes skipping application of sparks, and applying a changed ignition angle relative to the operating band for first at least one spark initiated after the speed limitation operation.

Applying a reduction of the ignition angle in relation to the operating band for a controlled number of first subsequent sparks after the speed limitation operation, in case the speed limitation operation has been performed, a comparatively great reduction of the ignition angle can be permitted without risking heat problems. Such great reduction is desirable in order to effectively avoid too high pressures within the cylinder and quickly return to normal pressures after the speed limitation operation.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
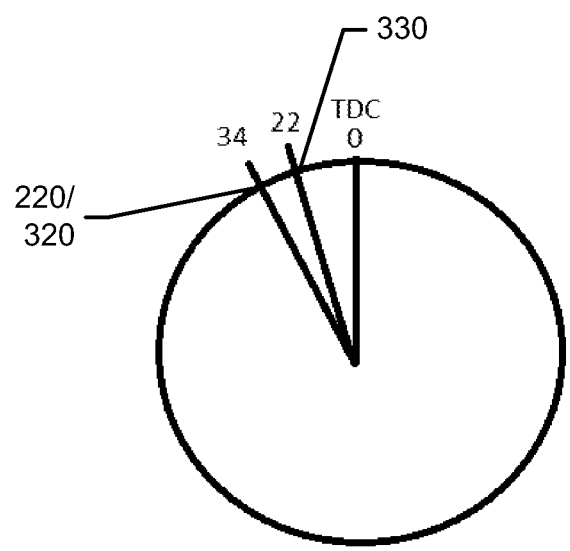
Figure 6:
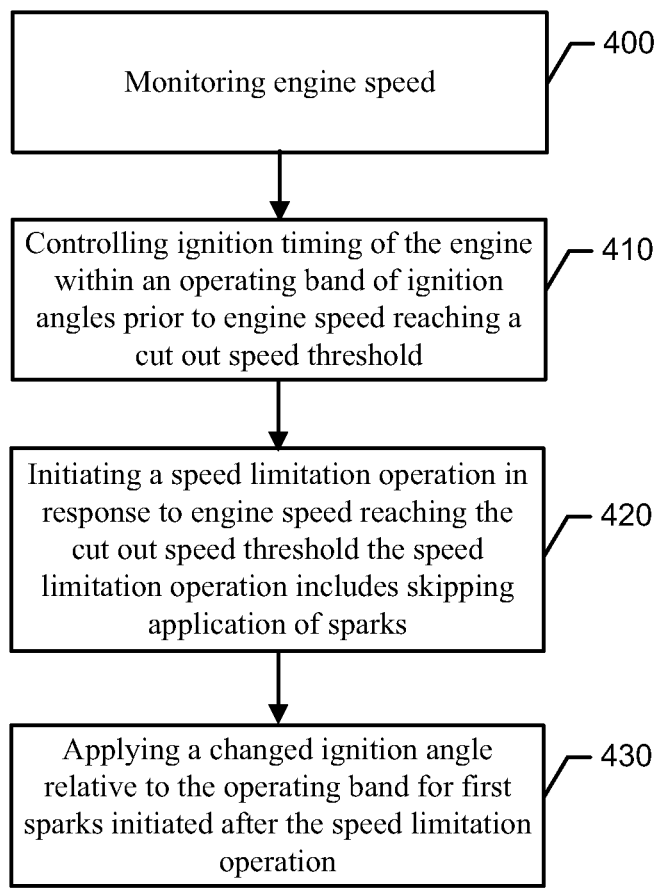

FIG. 5 further illustrates the ignition angle concept in accordance with an example embodiment; and FIG. 6 illustrates a method of controlling an internal combustion engine according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may provide for an IC engine that employs a control algorithm to change the ignition angle of the first at least one spark after exiting a speed limitation operation. In some cases, the ignition angle of the first sparks may be changed by an amount that is based on the number of sparks skipped. Thus, for example, the ignition angle may be reduced for the initial sparks after a cut out has occurred. Moreover, in some embodiments, the magnitude of the reduction in ignition angle may be larger for more powerful engines, or smaller for less powerful engines. In other words, in some cases, the amount of the reduction may be proportional to the size and/or power of the engine. It should be appreciated that although an example embodiment will be shown and described illustrating a crank case scavenged IC engine that may be used in connection with a hand held chainsaw, example embodiments could be practiced in connection with engines for other similar devices such as pole saws, trimmers, brush cutters, and/or the like.

Figure 1:
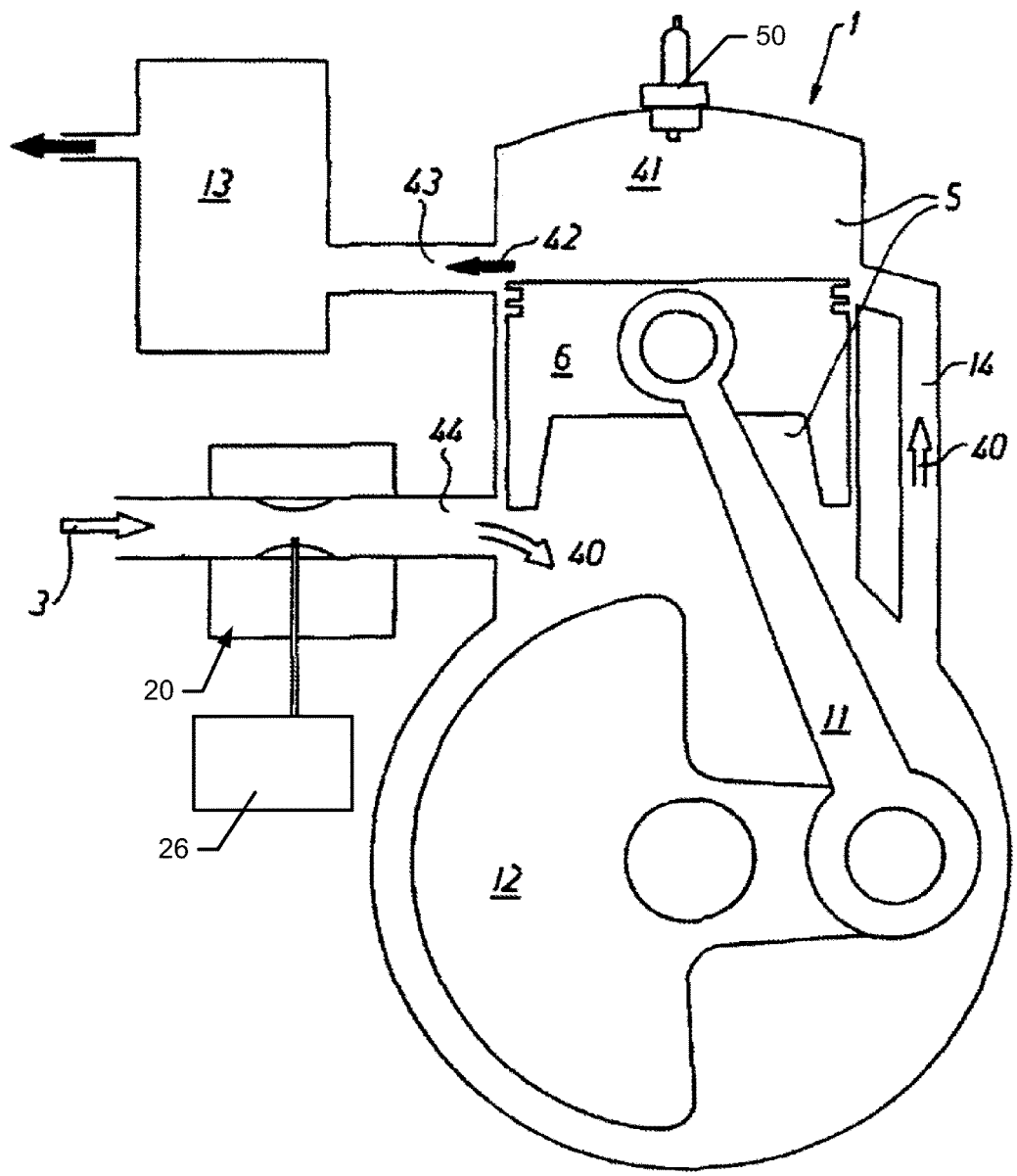
FIG. 1 illustrates a schematic view of a two-stroke internal combustion engine according to an example embodiment.

FIG. 1 illustrates a schematic view of a two-stroke IC engine 1. However, example embodiments could also be practiced in connection with IC engines of different types (e.g., four-stroke IC engines). The engine 1 of FIG. 1 is crank case scavenged in which, for example, a mixture 40 of air 3 and fuel from a fuel supply system 20 (e.g., a carburetor or low pressure fuel injection system) is drawn to the engine crank case. From the crank case, the mixture 40 is carried through one or several scavenging passages 14 up to an engine combustion chamber 41. The engine combustion chamber 41 is provided with a spark plug 50 that ignites the compressed air-fuel mixture. Exhausts 42 may exit through an exhaust port 43 and through a muffler (silencer) 13. Preferably, the engine is of a stratified scavenging type. I.e., at least one air passage (not shown) is arranged between an air inlet and the upper part of the scavenging passage 14, such that the scavenging passage 14 can be supplied with, and hold so much fresh air that during the following scavenging process it will scavenge essentially nothing but air. Preferably, the supply of fresh air to the upper part of the scavenging passage 14 is piston ported, and suitably, the piston includes at least one recess providing for a connection between the air passage and the upper part of the scavenging passage 14 for certain piston positions.

The engine 1 may also include the piston 6 that is attached to a crank portion 12 equipped with a counter weight via a connecting rod 11. In FIG. 1, the piston 6 assumes an intermediate position in which flow is possible both through the intake port 44, the exhaust port 43 and through the scavenging passage 14. The mouth of intake passage 21 into the cylinder 5 may be referred to as the intake port 44. Accordingly, the intake passage 21 may be closed by the piston 6. By opening and closing the intake passage 21, varying flow speeds and pressures may be created inside the passage. These variations largely affect the amount of fuel supplied when the fuel supply system 20 is a carburetor. Since a carburetor has an insignificant fuel feed pressure, the amount of its fuel feed is entirely affected by pressure changes in the intake passage 21. The supplied amounts of fuel may be considered to be affected by the varying flow speeds and pressures inside the intake passage 21 based on opening and closing of the intake passage 21. Since the crank case in crank case scavenged two-stroke engines or crank case scavenged four-stroke engines can hold a considerable amount of fuel and consequently serve as a leveling reservoir, it is not necessary to adjust the fuel supply for each revolution. Instead, adjustment of fuel supply in one revolution may affect subsequent revolutions.

Figure 2:
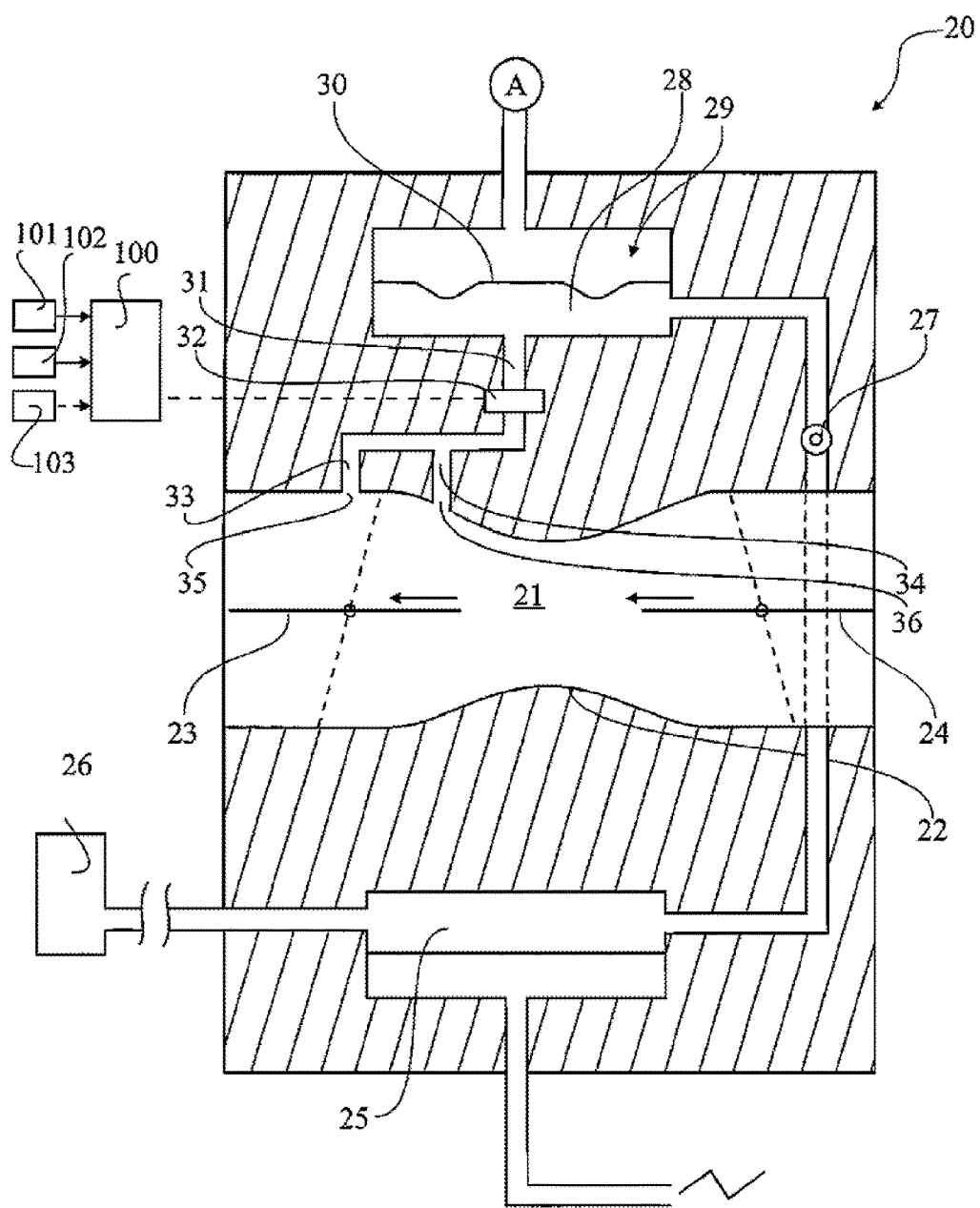
FIG. 2 illustrates a carburetor type fuel supply system in accordance with an example embodiment.

FIG. 2 illustrates a carburetor type fuel supply system 20 in accordance with an example embodiment. As shown in FIG. 2, the carburetor of the fuel supply system 20 includes the intake passage 21 having a venturi 22. A throttle valve 23 is also provided along with a choke valve 24 in the intake passage 21. The carburetor of the fuel supply system 20 also includes a fuel pump 25, which draws fuel from a fuel tank 26. The fuel pump 25 may be a pulsation controlled diaphragm pump, which could be driven by pressure pulses generated by a crank case of the engine 1 of FIG. 1. The fuel pump 25 delivers fuel, via a needle valve 27, to a fuel metering chamber 28 of a fuel regulator 29.

The fuel metering chamber 28 may be separated from atmospheric pressure by a diaphragm 30 and may be configured to hold a predetermined amount of fuel. A duct 31 from fuel metering chamber 28 may lead to a fuel valve 32. The fuel valve 32 may be a bistable valve, operating between open and closed positions. The fuel valve 32 may open or close the interconnection between the fuel metering chamber 28 and the fuel lines (33 and 34), leading to the intake passage 21. A finer channel 33 among the fuel lines may lead to an idle nozzle 35 downstream of the throttle valve 23. Due to the varying pressures in the intake passage 21 as the engine operates, fuel is drawn from the fuel metering chamber 28 through the main nozzle 36 and the idle nozzle 35. When the fuel valve 32 is closed, fuel is prevented from being drawn from the fuel metering chamber 28. When the throttle valve 23 is closed, fluid is drawn substantially from the idling nozzle 35. However, since the coarser fuel line 34 to the main nozzle 36 is substantially larger than the finer fuel line 33 to the idling nozzle 35, the idling nozzle 35 may only have small effects on the fuel supply during full throttle operation.

The fuel valve 32, which may in some cases be solenoid operated, may be controlled by an electronic control unit (ECU) 100. The ECU 100 may also control operation of the spark plug 50 for the application of spark to ignite the mixture 40 in the combustion chamber 41. As such, in some embodiments, the ECU 100 may be an ignition control device or may include an ignition control device. ECU 100 may receive sensor inputs such as, for example, throttle position from a throttle position sensor 101 (or sensors), engine speed data from an engine speed sensor 102 (or sensors), and/or inputs from an additional sensor 103 (or sensors). The additional sensor 103 could be a temperature sensor or any other suitable parameter measurement sensor. The ECU 100 may use the sensor inputs to control the A/F ratio by deciding when to open or close the fuel valve 32 and/or to control the timing of application of spark for ignition of the mixture 40 in the combustion chamber 41. Although the ECU 100 is shown as a single unit in FIG. 2, it should be appreciated that the ECU 100 could be embodied as multiple units in some cases. The units could be function-specific if desired. Thus, for example, one ECU could fuel supply and one ECU could control ignition (e.g., timing). However, the ECU 100 could also be a single unit that is configured to perform multiple functions.

Engine speed data may be obtained via any of a number of different ways. For example, a flywheel that rotates with the same speed as the engine crank may have one or more magnets provided on its periphery. The magnets can be used to provide energy to the ignition system as well as to other electronic components such as the ECU 100, but may also be used for monitoring the engine speed by having the engine speed sensor 102 comprising a stationary detection unit arranged to detect each time the magnet (or magnets) of the flywheel pass the detection unit. The accuracy of the engine speed sensor 102 may be dependent upon the number of magnets on the flywheel and the number of detection units. For example, by using one magnet and one detection unit, the time it takes for a full rotation can be measured, and by using two magnets and one detection unit, the time it takes for a half rotation of the flywheel can be measured. If engine speed is to be measured more frequently, the number of magnets and/or the detection units can be increased. Alternatively or additionally, other methods of providing engine speed data may be employed within the spirit and scope of example embodiments.

The fuel supply may be controlled by closing the fuel valve 32 (e.g., shutting off the fuel supply) during a number (Ns) of evenly distributed revolutions, utilizing the leveling characteristic of the crank case. The fuel valve 32 may be closed during the entire intake cycle for the revolutions for which it is closed, and may be fully open during the entire intake cycle for revolutions for which it is open. This control may be performed, for example, in consecutive periods of revolutions in which each period has a fuel valve control sequence Ns/PL that determines the number (Ns) of shut-offs for a period of PL revolutions. A first period may be followed by a second period, which may be followed by a third period and so on. Each such period may have a corresponding fuel valve control sequence Ns/PL, and an example period length may be 256 with shut offs being distributed (perhaps evenly) throughout the period. Thus, for example, if shut offs are evenly distributed over the period length (e.g., Ns/PL=128/256), the fuel supply may be shut-off every second revolution.

In some embodiments, an engine speed limitation may be applied by skipping ignition of the engine when the engine speed exceeds a cut out speed threshold, which could be set dynamically, or which could be a fixed value. In some cases, the cut out speed threshold may be reached when the operator runs the engine at full throttle without any load. The speed may then toggle or fluctuate around the cut out speed threshold. This fluctuation may be referred to as "hysteresis" and may be dependent upon the A/F ratio. Directly after combustion, the engine speed acceleration may tend to be larger if the A/F ratio is more power optimal. The increased acceleration may be manifested, for example, by an increased period length and an increased amplitude length in the diagram of FIG. 3.

Figure 3:
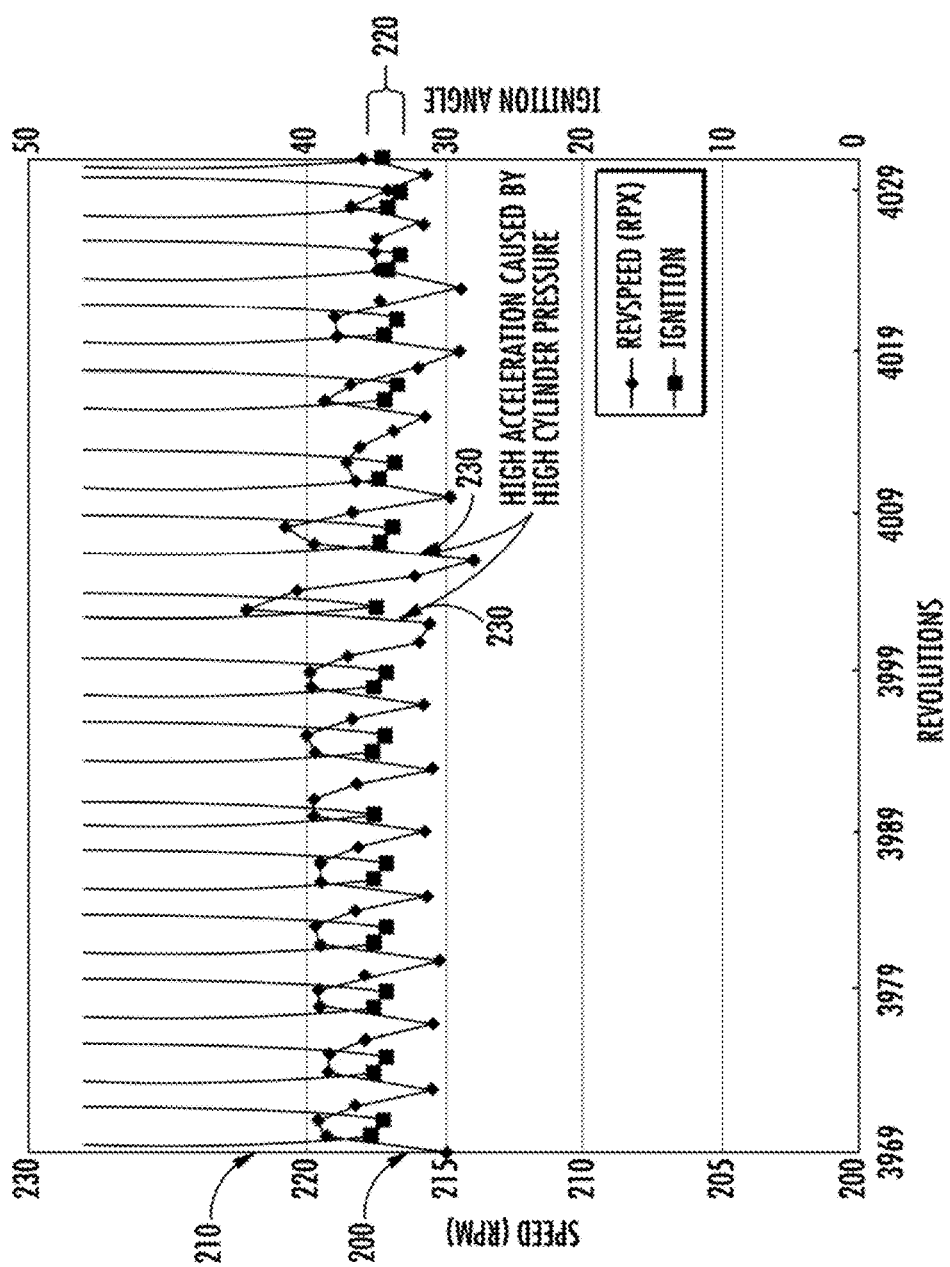
FIG. 3 illustrates a plot of engine speed versus revolutions, and the corresponding ignition timing during normal engine operation.

Ignition timing generally involves the process of setting an ignition angle relative to piston position and angular velocity of the crank shaft at which a spark will be applied by the spark plug 50. Thus, for example, the ignition angle may be embodied as an angle advanced before top dead center so that the spark is provided before the combustion chamber reaches its minimum size during the stroke cycle. If the ignition timing is not properly set, excessive vibration or engine damage may occur. FIG. 3 illustrates a plot of engine speed versus revolutions, and the corresponding ignition timing during normal engine operation. As shown in FIG. 3, the speed curve 200 with diamond shapes represents the engine speed in revolutions per second (rps) and shows a common hysteresis type fluctuation of speed. Meanwhile, the ignition timing curve 210 is represented by the curve with square shapes. As shown in FIG. 3, ignition timing may be operated at a normal or operating value of about 34 degrees to define an operating range 220 of ignition timing values at or near the normal or operating value. This operating range 220 may be as small as a single value (e.g., 34 degrees in this example) or may extend to cover larger range of values. Above the cut out speed threshold, spark application may be stopped, as described above. Ignition timing that is marked as 50 degrees in FIG. 3 represents measurements of the ignition timing when there is no spark applied. However, when the spark is reapplied, within a normal band of ignition timing values (e.g., around the operating value of about 34 degrees of this example), the delay of ignition may cause a relatively high acceleration based on the high cylinder pressure as shown at high acceleration points 230 on FIG. 3. The normal band of ignition angles is the band used for speeds above clutch engagement, i.e. above idle. In the preferred embodiment, the ignition angle is about 34 degrees for speeds above clutch engagement, but may be chosen differently depending on the engine, such as between 20 and 45 degrees.

Figure 4:
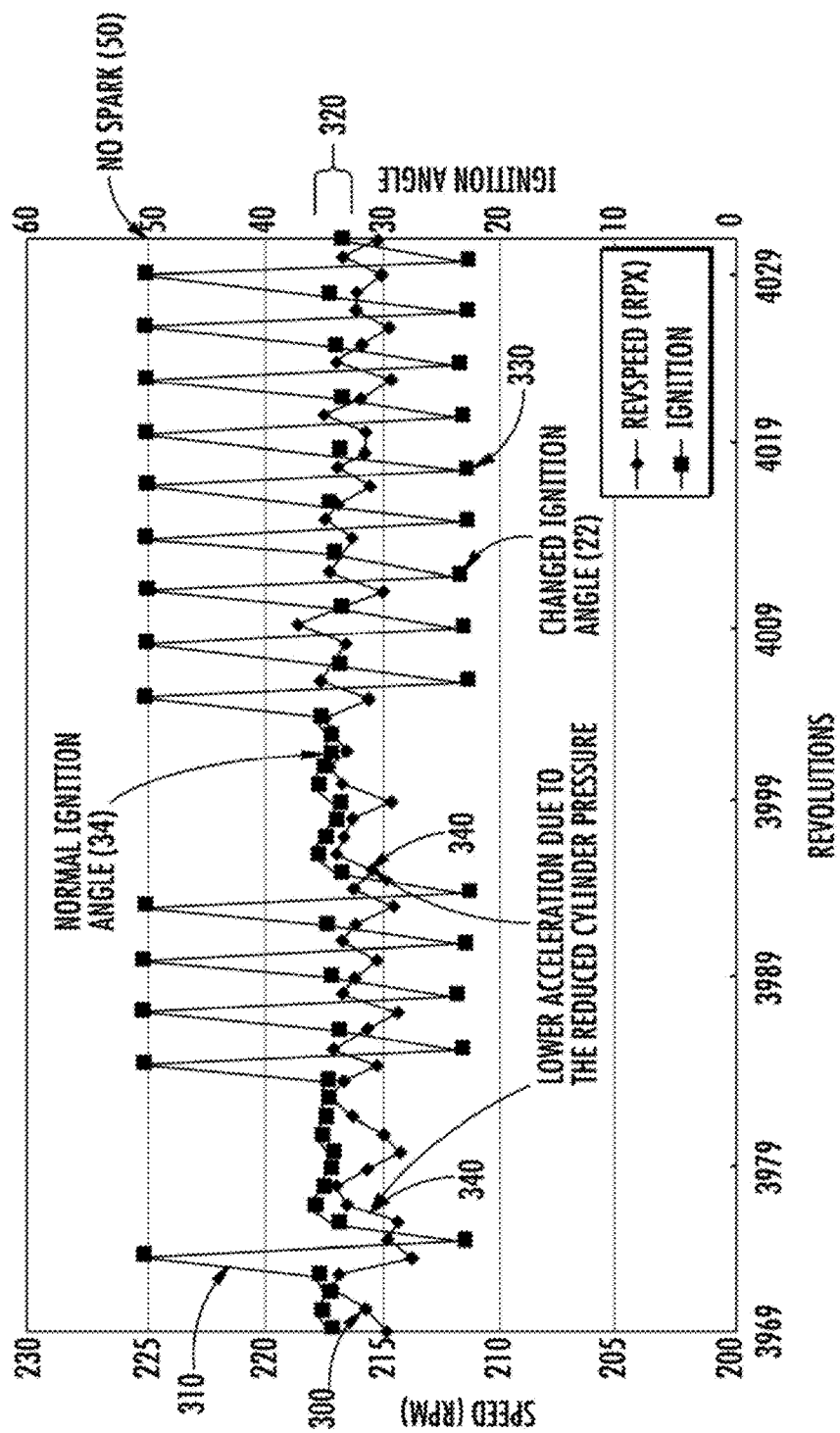
FIG. 4 illustrates a plot of engine speed versus revolutions, and the corresponding ignition timing during engine operation according to an example embodiment in which ignition angle modification after speed limitation is introduced.

In accordance with an example embodiment, the ECU 100 may be configured to provide for changing of the ignition angle to preferably lower the ignition angle below the normal or operating value provided in FIG. 3. FIG. 4 illustrates a plot of engine speed versus revolutions, and the corresponding ignition timing during engine operation according to this example embodiment in which ignition angle modification after speed limitation is introduced. FIG. 4 also shows a speed curve 300 with diamond shapes representing the engine speed in (rps) with the common hysteresis type fluctuation of speed. Meanwhile, the ignition timing curve 310 is represented by the curve with square shapes.

As shown in FIG. 4, the ignition timing may be adjusted such that the ignition angle is generally maintained within an operating range 320 at or about the normal or operating value of FIG. 3 (e.g., about 34 degrees) as described above. Again, ignition timing that is marked as 50 degrees in FIG. 4 represents measurements of the ignition timing when there is no spark applied. However, in this example, dependent upon when a speed limitation operation is stopped (e.g., after coming out of spark skipping initiated by reaching a cut out speed threshold), the ignition angle is lowered below the normal or operating value of FIG. 3 to a changed ignition angle 330. Thus, a reduction in ignition angle outside the operating range 320 (i.e., to the changed ignition angle 330) may be provided for the first at least one spark after sparks are skipped and for a controlled number of sparks, as a result of introduction of a speed limitation operation due to the cut out speed threshold being reached. In this example, the ignition angle is lowered to the changed ignition angle 330, which comprises a new minimum value of about 22 degrees, after exiting from a speed limitation operation. The speed curve 300 shows the effects of this modification at acceleration points 340, which should be appreciated as having a lower acceleration than the corresponding acceleration points 230 of FIG. 3. The lower acceleration is due to the lower cylinder pressure caused by this ignition timing adjustment.

FIG. 5 further illustrates the ignition angle concept in accordance with an example embodiment. As shown in FIG. 5, top dead center (TDC) is at an ignition angle timing of zero degrees. The normal operating band defined by the operating range (220/320) of the examples of FIGS. 3 and 4 is at about 34 degrees. Meanwhile, in the example of FIG. 4, the changed ignition angle 330 is about 22 degrees. However, a desired effect is at least present at reduction of the ignition angle of more than 5 degrees and when applying the reduced angle for the first at least one spark. However, preferably, the reduction of the ignition angle is at least 7, 8 or 10 degrees such as in the order of 12 degrees, or at least 20% or preferably at least 30% in relation to the normal operating band of ignition angles, or relative to the ignition angle applied immediately before entering the speed limitation operation. Preferably, the reduced angle is applied for the first two subsequent sparks, which would be favorable in the event the first spark would for some reason not ignite the mixture in the combustion chamber. Further, applying the reduced angle for 3 or more sparks may also be desirable. Preferably, the reduced angle is not applied for more than 4 subsequent sparks.

Accordingly, ignition timing may operate normally within a range of values. However, when the engine speed increases above the cut out speed threshold, spark application may be stopped, as described above. When the spark is reapplied, the ignition timing may be adjusted by the ECU 100 such that the ignition angle is reduced outside of the range of values used when there is no cut out. Thus, ignition angle is reduced for the at least one first spark after cut out and a significant reduction in cylinder pressure may be achieved. The reduced cylinder pressure may facilitate the reduction of noise, damage, fuel consumption and vibration of the engine. As a result, the engine may have an extended lifetime.

In the example described above, the normal operating range of ignition angles was in the area of about 34 degrees and the further reduction in ignition angle was to about 22 degrees. However, it should be appreciated that these values are merely examples, and other values may apply in connection with other example embodiments. Moreover, it should be appreciated that a constant ignition angle may be employed (or desired for employment) in some embodiments. Thus, the normal operating range of ignition angles may include a single value, in some embodiments. In general, the amount of change between the normal minimum value and the reduced minimum value may depend upon the size of the engine. In this regard, the more power the engine has, the more change that can be expected between the normal minimum value and the reduced minimum value. The amount of change also depends upon the ignition angle at cut out.

FIG. 6 illustrates an example of a control algorithm in association with an example embodiment. Thus, FIG. 6 illustrates a block diagram of a method of controlling an internal combustion engine. The method may include monitoring engine speed at operation 400, controlling ignition timing of the engine within an operating band of ignition angles prior to engine speed reaching a cut out speed threshold at operation 410, initiating a speed limitation operation in response to engine speed reaching the cut out speed threshold the speed limitation operation includes skipping application of sparks at operation 420, and applying a changed ignition angle relative to the operating band for the first spark/s initiated after the speed limitation operation at operation 430.

In some embodiments, the operations described above may be modified or augmented with one or more optional features. For example, in some cases, applying the changed ignition angle may include lowering the changed ignition angle based on the number of skipped sparks associated with the speed limitation operation. In an example embodiment, applying the changed ignition angle may include determining a magnitude of change of the changed ignition angle based on power of the engine, or based on pressure, acceleration or speed from a previous combustion with changed ignition angle. In some cases, applying the changed ignition angle may include determining a magnitude of change of the changed ignition angle based on ignition angle at cut out speed. In some embodiments, monitoring engine speed comprises monitoring engine speed via an electronic control unit coupled to a speed sensor. Moreover, in an example embodiment, the method above may be performed with respect to an internal combustion engine of a chainsaw, pole saw, brush cutter, or trimmer.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. An internal combustion engine comprising:
a combustion chamber into which a mixture of fuel and air is supplied;
a spark plug disposed proximate to the combustion chamber to ignite the mixture by generating a spark, ignition of the mixture driving a piston operably coupled to a crank portion of the engine;
a speed sensor configured to determine engine speed; and
an electronic control unit configured to control operation of the spark plug, the electronic control unit being configured to initiate a speed limitation operation in response to engine speed reaching a cut out speed threshold and to control ignition timing within an operating band of ignition angles prior to engine speed reaching the cut out speed threshold,
wherein the speed limitation operation includes skipping application of sparks,
wherein the electronic control unit, in case the speed limitation operation having been performed, is further configured to apply a changed ignition angle relative to the operating band for the first at least one spark initiated after the speed limitation operation,
wherein the electronic control unit is configured to reduce the ignition angle relative to the operating band for said first at least one spark, and
wherein a magnitude of change of the changed ignition angle is based on at least one of the number of skipped sparks during the speed limitation operation or pressure within cylinder.

2. The internal combustion engine of claim 1, wherein a magnitude of change of the changed ignition angle is further based on
acceleration or speed after a previous combustion with changed ignition angle.

3. The internal combustion engine of claim 1, wherein the magnitude of change of the changed ignition angle is further based on ignition angle at cut out speed.

4. The internal combustion engine according to claim 1, wherein the reduction of ignition angle is more than 5 degrees and is applied for said first at least one spark.

5. The internal combustion engine according to claim 1, wherein the reduced ignition angle is applied for the first at least two subsequent sparks.

6. The internal combustion engine according to claim 1, wherein the reduction of ignition angle is at least 20% and is applied for the first two subsequent sparks.

7. The internal combustion engine according to claim 1, wherein the reduction of ignition angle is applied for a maximum of first four subsequent sparks.

8. The internal combustion engine according to claim 1, comprising a fuel control system including a fuel valve to control fuel provision into the mixture, wherein the fuel valve is controlled by the electronic control unit.

9. A hand-held device comprising:
a working assembly configured to perform a cutting operation; and
an internal combustion engine, which is operably coupled to the working assembly to power the working assembly,
wherein the internal combustion engine comprises:
a combustion chamber into which a mixture of fuel and air is supplied;
a spark plug disposed proximate to the combustion chamber to ignite the mixture by generating a spark, ignition of the mixture driving a piston operably coupled to a crank portion of the engine;
a speed sensor configured to determine engine speed; and
an electronic control unit configured to control operation of the spark plug, the electronic control unit being configured to initiate a speed limitation operation in response to engine speed reaching a cut out speed threshold and to control ignition timing within an operating band of ignition angles prior to engine speed reaching the cut out speed threshold,
wherein the speed limitation operation includes skipping application of sparks, and wherein the electronic control unit, in case the speed limitation operation having been performed, is further configured to apply a changed ignition angle relative to the operating band for the first at least one spark initiated after the speed limitation operation,
wherein the electronic control unit is configured to reduce the ignition angle relative to the operating band for said first at least one spark, and
wherein a magnitude of change of the changed ignition angle is based on at least one of the number of skipped sparks during the speed limitation operation or pressure within cylinder.

10. A method of controlling an internal combustion engine, the method comprising:
monitoring engine speed;
controlling ignition timing of the engine within an operating band of ignition angles prior to engine speed reaching a cut out speed threshold;
initiating a speed limitation operation in response to engine speed reaching the cut out speed threshold, the speed limitation operation including skipping application of sparks; and
applying a changed ignition angle relative to the operating band for first at least one spark initiated after the speed limitation operation,
wherein applying the changed ignition angle comprises reducing the ignition angle relative to the operating band for the first at least one spark after the speed limitation operation, and
wherein applying the changed ignition angle comprises determining a magnitude of change of the changed ignition angle based on at least one of the number of skipped sparks during the speed limitation operation or pressure within cylinder.

11. The method of claim 10, wherein applying the changed ignition angle further comprises determining a magnitude of change of the changed ignition angle based on acceleration or speed after a previous combustion with changed ignition angle.

12. The method of claim 10, wherein applying the changed ignition angle further comprises determining a magnitude of change of the changed ignition angle based on ignition angle at cut out speed.

13. The method of claim 10, wherein reducing the ignition angle comprises reducing the angle by more than 5 degrees for the first at least one spark initiated after the speed limitation operation.

14. The method of claim 10, wherein the reduced ignition angle is applied for the first at least two subsequent sparks.

15. The method of claim 10, wherein reducing the ignition angle comprises reducing the ignition angle by at least 20% and is applied for the first two subsequent sparks.

16. The method of any claim 10, wherein the reduced ignition angle is applied for a maximum of first four subsequent sparks.

17. The method of claim 10, wherein monitoring engine speed comprises monitoring engine speed via an electronic control unit coupled to a speed sensor.

18. The method of claim 10, wherein monitoring engine speed comprises monitoring engine speed of an engine of a chainsaw, pole saw, brush cutter, trimmer, or cut-off saw.

* * * * *